United States Patent [19]

Cuscurida et al.

[11] Patent Number: 4,488,982
[45] Date of Patent: Dec. 18, 1984

[54] LOW FOAMING NONIONIC POLYETHER POLYCARBONATE SURFACTANTS AND FUNCTIONAL FLUIDS

[75] Inventors: Michael Cuscurida; Robert M. Gipson, both of Austin, Tex.

[73] Assignee: Texaco Development Corp., White Plains, N.J.

[21] Appl. No.: 275,468

[22] Filed: Jun. 19, 1981

Related U.S. Application Data

[63] Continuation of Ser. No. 171,504, Jul. 23, 1980, abandoned, which is a continuation of Ser. No. 25,424, Mar. 30, 1979, abandoned.

[51] Int. Cl.³ .................. C11D 1/72; C11D 1/875; C07C 69/00
[52] U.S. Cl. .................. 252/174.21; 252/89.1; 252/174.22; 252/174.23; 252/351; 252/DIG. 2; 252/DIG. 1; 260/463
[58] Field of Search .................. 252/52 R, 52 A, 73, 252/174.21, 174.23, 174.22, 351, DIG. 1, DIG. 2; 260/463

[56] References Cited

U.S. PATENT DOCUMENTS

| | | | |
|---|---|---|---|
| 2,866,757 | 12/1958 | Newman et al. | 252/56 |
| 3,133,113 | 5/1964 | Malkemus | 260/463 |
| 3,332,980 | 7/1967 | Leary et al. | 260/463 |
| 3,432,473 | 3/1969 | Seeliger | 260/77.5 |
| 3,642,858 | 2/1972 | Frevel et al. | 260/463 |
| 3,689,462 | 9/1972 | Maximovich | 260/463 X |
| 4,222,954 | 9/1980 | Cuscurida et al. | 260/463 |
| 4,330,481 | 5/1982 | Timberlake et al. | 260/463 |

FOREIGN PATENT DOCUMENTS

| | | |
|---|---|---|
| 2615665 | 10/1976 | Fed. Rep. of Germany |
| 2712162 | 9/1978 | Fed. Rep. of Germany |

*Primary Examiner*—Prince E. Willis
*Attorney, Agent, or Firm*—Robert A. Kulason; James L. Bailey

[57] ABSTRACT

Improved surfactants and functional fluids are prepared by reacting a monofunctional initiator with an alkylene carbonate or with an alkylene oxide and carbon dioxide to form polyether polycarbonate materials. As surfactants, the resulting materials exhibit reduced foaming characteristics as compared to other nonionic surfactants. The viscosity-temperature relationships, flash points and pour points make them useful as functional fluids.

10 Claims, No Drawings

LOW FOAMING NONIONIC POLYETHER POLYCARBONATE SURFACTANTS AND FUNCTIONAL FLUIDS

This is a continuation of application Ser. No. 171,504, filed July 23, 1980, which is a continuation of application Ser. No. 025,424 filed Mar. 30, 1979, both abandoned.

BACKGROUND OF THE INVENTION

A low foaming nonionic surfactant would have many industrial applications where prior art nonionic surfactants cannot be used. Past efforts to create a low foaming nonionic surfactant have proved largely unsucessful.

Prior art nonionic surfactants are predominately ethylene oxide adducts of detergent range alcohols, about $C_8$ to about $C_{18}$ alcohols, or alkyl phenols which possess high foaming characteristics. Other alcohols having fewer carbon atoms have heretofore been useful largely as functional fluids and the like while possessing little, if any, surface active properties. We have discovered that foaming and detergent characteristics and viscosity characteristics of monohydroxyl or monocarboxyl aliphatic compounds can be varied by reaction, in certain proportions, with alkylene carbonates or with an alkylene oxide and carbon dioxide to provide novel compounds having different and unexpected properties.

The general reaction procedures for preparing the polyether polycarbonate materials are described by Stevens in U.S. Pat. Nos. 3,248,414; 3,248,415; and 3,248,416 which teach the preparation of polyether polycarbonates from carbon dioxide and alkylene oxide; (2) alkylene carbonate; and (3) alkylene carbonate and alkylene oxide. According to the described method, a minor amount of polyfunctional initiator such as between 0.005 to about 0.2 moles of a polyhydric initiator per mole of alkylene oxide or alkylene carbonate is employed. The reactions are conducted under superatmospheric pressure in the presence of a metal oxide, metal carbonate, trisodium phosphate or tertiary amine catalyst to produce high molecular weight polyether polycarbonates wherein the polyfunctional initiator is incorporated internally to the polymer.

These polyfunctional polycarbonates are generally viscous, syrupy liquids or waxy solids and are taught to be useful for reaction with other polyfunctional materials such as polyisocyantes to form various polymers. A primary use has been the reaction with dicarboxylic acids to produce valuable and highly useful alkyd resins.

The catalysts employed in the polycarbonate reaction are well described in Maximovich, U.S. Pat. Nos. 3,689,462 and 3,896,090 which teach the use of a metal stannate catalyst such as potassium stannate and titanate, tetraborate and metaborate catalyst to prepare polyether polycarbonates according to the methods disclosed by Stevens.

While the methods of preparing polyether polycarbonates and the applicability of such materials for the formation of other useful polymers is well known, no one has heretofore recognized the usefulness of monofunctional polycarbonate materials. Until now the applicability of the reaction to produce a new class of surface active agents and functional fluids has been totally unrecognized.

SUMMARY OF THE INVENTION

It has now been found that the incorporation of an alkoxy-carbonate chain segment into a polyethylene oxide polymer (thereby producing a polyether carbonate compound) serves to reduce the water solubility of the polyethylene oxide polymer and provides a compound having low foaming characteristics. These compounds are useful as surfactants and functional fluids. By employing an initiator compound such as an alcohol, alkylene oxide adduct of an alcohol, alkylphenol, alkylene oxide adduct of an alkyl phenol or monocarboxylic acid; selecting the monofunctional initiator for its solubility or surfactant properties, controlling the mole ratio of alkylene oxide to carbon dioxide between the ranges of from about 1 to about 10; and controlling the average number of carbonyl groups in the ethoxycarbonyl chain segment per mole of initiator compound between from 1 to about 30; a mixture of useful low foaming polyether carbonate compounds are produced which possess a wide variety of surfactant properties and low foaming characteristics.

Stated differently, the compounds of this invention are a mixture of low foaming aliphatic polyether-carbonate compounds for use as surface active agents or functional fluids, consisting of:

(a) an initiator compound segment derived from initiator compounds having a single reactive hydroxyl or carboxyl group attached to an alkyl or alkylphenyl group, or an alkylene oxide adduct thereof; and (b) an alkoxycarbonyl chain segment attached to the initiator compound at the site of the hydroxyl or carboxyl group by the reaction of an alkylene carbonate having from two to six carbon atoms, or a mixture of an alkylene oxide having two to five carbon atoms, and carbon dioxide at the ratio of from one to ten moles of the alkylene oxide per mole of carbon dioxide, wherein there is present an average of from one to thirty carbonyl groups in the alkoxycarbonyl chain segment per mole of initiator compound.

It has been found that the aforesaid aliphatic polyether-carbonate materials of this invention possess viscosity-temperature relationships, flash points and pour points which make them useful as functional fluids.

DESCRIPTION OF PREFERRED EMBODIMENTS

The monohydric polyether polycarbonate materials of the instant invention are prepared by catalytically reacting, at autogenous pressure an initiator compound having a single reactive hydroxyl or carboxyl group attached to an alkyl or alkylphenyl group, or an alkylene oxide adduct thereof, with an alkylene oxide and carbon dioxide or an alkylene carbonate.

Thus formed, the compounds of this invention are a mixture of low foaming aliphatic polyether-carbonate compounds for use as surface active agents or functional fluids, consisting of:

(a) an initiator compound segment derived from an initiator having a single reactive hydroxyl or carboxyl group attached to an alkyl or alkylphenyl group, or an alkylene oxide adduct thereof; and (b) an alkoxycarbonyl chain segment of groups attached to the initiator compound at the site of the hydroxyl or carboxyl group by the reaction of an alkylene carbonate having from two to six carbon atoms, or a mixture of an alkylene oxide, having two to five carbon atoms, and carbon dioxide at the ratio of from one to ten moles of the alkylene oxide per mole of carbon dioxide, wherein there is present an average of from one to thirty carbonyl groups in the alkoxycarbonyl chain segment per mole of initiator compound.

Essential to the production of the polyether polycarbonate-materials of this invention is the use of a monofunctional initiator in an amount such that the mole ratio of alkylene oxide and carbon dioxide to the monofunctional initiator is from about 2 to about 30. Suitable monofunctional initiators are alcohols, alkylene oxide adducts of alcohols, alkyl phenols, alkylene oxide adducts of alkyl phenols or mono carboxylic acids. The preferred initiator compounds are alcohols having from about 6 to about 22 carbon atoms and, more particularly secondary alcohols having from about 11 to about 15 carbon atoms; one to about eight mole alkylene oxide, particularly ethylene oxide or propylene oxide, adduct of an alcohol having from 1 to about 8 carbon atoms and, more particularly, the three mole ethylene oxide adduct of an alcohol having from 12 to 13 carbon atoms and a seven mole propylene oxide adduct of n-butanol; alkyl phenols wherein the alkyl moiety has from about 4 to about 16 carbon atoms and, more particularly, nonyl phenol; one to about fifteen mole alkylene oxide, particularly ethylene oxide or propylene oxide, adduct of an alkyl phenol having an alkyl moiety from about 4 to about 15 carbon atoms, and more particularly, the six to twelve mole ethylene oxide adduct of nonyl phenol; and a monocarboxylic acid having from about 4 to about 22 carbon atoms and, more particularly, oleic acid.

The chain segment of alkoxycarbonyl groups attached to the initiator compound at the site of the hydroxyl or carboxyl group is formed by reaction of an alkylene carbonate or a mixture of alkylene oxide and carbon dioxide with the initiator compound. Suitable alkylene carbonates are those having from two to six carbon atoms with ethylene carbonate or propylene carbonate being preferred. Alkylene oxide and carbon dioxide reaction products are present in the alkoxycarbonyl chain segment at a ratio of from one to ten moles alkylene oxide per mole of carbon dioxide and the chain segment contains an average of from 1 to about 30 carbonyl groups per mole of the initiator compound.

The preferred embodiments of the mixture of low foaming aliphatic polyether-carbonate compounds of this invention are not specifically discussed hereinafter in connection with the discussion of the preparation of these mixtures.

In preparing the compounds of this invention, a wide variety of catalysts may be employed in the reaction of the instant invention. Among the well-known catalysts which have been found to be useful are alkali carbonates such as sodium, potassium, calcium and magnesium carbonate; alkali hydroxides such as sodium hydroxide, potassium hydroxide and calcium hydroxide; alkali carbonates such as potassium bicarbonate; tertiary amines such as n-alkyl morpholines; and other inorganic or organic base catalyst such as are illustrated in U.S. Pat. No. 3,248,415. It is also possible to employ an alkali metal stannate, alkaline earth metal stannate or ammonium stannate. Exemplary of suitable stannate catalyst are sodium stannate trihydrate, potassium stannate trihydrate, potassium stannate monohydrate, barium stannate trihydrate, and magnesium stannate trihydrate, and other like catalysts as discussed in U.S. Pat. Nos. 3,689,462 and 3,896,090. The disclosure of the above patents are incorporated herein by reference as illustrative of the use of the known catalyst for the polyether polycarbonate reaction.

The preferred catalyst is potassium stannate as used in the amounts as disclosed by the above U.S. Pat. No. 3,689,462. The disclosure of the foregoing patents are incorporated herein by reference for the catalysts and reaction conditions stated therein.

An alkylene oxide and carbon dioxide are charged to a reaction vessel designed to withstand elevated pressures in a mole ratio of from about 1 to about 10. An initiator compound is charged in an amount such that the mole ratio of carbon dioxide to the initiator compound is from about 2 to about 30 such that the above-mentioned ratio of carbonyl groups in the ethoxycarbonyl chain segment will be attained. Af effective amount of the chosen catalyst is included. With the reaction vessel sealed the temperature is raised above 100° C. and autogenous pressure is developed. Under these conditions a monohydric ethoxycarbonyl chain segment is attached to the site of the hydroxyl or carboxyl group. The reaction is allowed to proceed to completion as indicated by the attainment of an equilibrium pressure in the reaction vessel. Upon completion of low foaming aliphatic polyether monohydric polyether carbonate material of this invention is recovered. Usually the method of recovery involves stripping the reaction mixture, which may, but need not, be neutralized with a magnesium silicate prior to stripping, to 150° C. at about 2 mm Hg and filtering, preferably with a filter aid such as Hyflo Supercel.

The reaction temperature is maintained above 100° C. and more particularly at a temperature in excess of 150° C., and less than that temperature at which there is a tendency for substantial rupture or decomposition of the polyether polycarbonate material to occur. When an alkylene oxide adduct of an alcohol or an alkyl phenol is used it is preferred to conduct the reaction between about 150° C. to about 200° C. in order to suppress possible initiator decomposition that may result in formation of difunctional materials in the reaction mixture. During the course of the reaction, the autogenous pressure has been found to rise to a maximum of from about 500 to about 1550 psig. As the reaction goes to completion the pressure decreases as the carbon dioxide is reacted with the alkylene oxide. The final equilibrium pressure upon completion of the reaction ranges from about 20 to about 100 psig. The pressure of the reaction depends upon the volume of the reactor, the temperature of the reactants and the number of moles of alkylene oxide and carbon dioxide charged. Although it is not essential, it is preferred to conduct the reaction so that the maximum pressure is from about 500 to about 1550 psig. Although it is not essential, it is generally preferred to allow the reaction to proceed to completion as indicated by attainment of a final equilibrium pressure in the reactor. The time to reach completion varies depending upon the types and amounts of materials charged and the reaction temperature but generally ranges from about 3 to about 9 hours.

Suitable alkylene oxides include epoxides such as ethylene oxide, propylene oxide, 1,2-butylene oxide or the like olefinically saturated aliphatic epoxides that have up to five carbons. Although it is not essential, the preferred alkylene oxides are ethylene oxide and propylene oxide.

Controlling the mole ratio of the alkylene oxide and carbon dioxide to the monohydric initiator is essential to the production of the materials of this invention in order that the ratio of carbonyl groups in the alkoxycarboxyl claim segment to the initiator compound is as set forth hereinbefore. This ratio may be varied from 1 to about 30. Preferred ratios depend upon the monohydric initiator used as follows: for alcohols a ratio of from about 5 to about 15; for alkylene oxide adducts of alcohols a ratio from about 10 to about 30; for alkyl phenols a ratio of from about 5 to about 20; for alkylene oxide adducts of alkyl phenols a ratio from about 5 to about 15; and for monocarboxylic acids a ratio from about 15 to about 25 are preferred.

Controlling the mole ratio of the alkylene oxide to carbon dioxide is also essential to the production of the materials of this invention. Generally, this ratio ranges from about 1 to about 10. The preferred alkylene oxide to carbon dioxide ratios depend upon the monohydric initiator used as follows: for example, for alcohols the ratio is from about 2 to about 4; for alkylene oxide adducts of alcohols, nonionic surfactants in their own right, albeit usually high foamers, the ratio is from about 2 to about 6; for alkyl phenols the ratio is from about 2 to about 4; for alkylene oxide adducts of alkyl phenols the ratio is from about 1 to about 4; and for monocarboxylic acids the ratio is from about 4 to about 8.

If an alkylene carbonate is employed as the source of carbon dioxide and alkylene oxide then the general reaction process is somewhat different. The alkylene carbonate and the monohydric initiator are charged to a reaction vessel in a mole ratio of from about 1 to about 10. An effective amount of catalyst, such as potassium stannate, for example, is included. The reaction vessel is fitted with a back pressure regulator which is set to about 100 psig. The reaction vessel, after being purged with prepurified nitrogen, is heated to a temperature above 100° C., about 180° C. is preferred, at which point carbon dioxide evolution begins. The reaction vessel is maintained at about 100° to about 185° C. until carbon dioxide evolution ceases at which time the reaction mixture is allowed to cool and the polyether carbonate material is recovered.

Essential to the performance of the invention by this process is the mole ratio of alkylene carbonate to monohydric initiator. A general range of from about 1 to about 30 may be employed with the range of from about 1 to about 10 being preferred to provide the alkoxy-carbonate chain segment as previously described.

The process of this invention and the characteristics of the resulting aliphatic low foaming polyether carbonate materials will now be illustrated by examples and tables that follow which are for the purpose of illustration and should not be considered to be a limitation on the scope of the invention.

EXAMPLE 1

This example will illustrate the preparation of a polyether carbonate from an alkyl phenol initiator. Into a one-liter stirred autoclave were charged 220 g. nonyl phenol, 176 g. ethylene oxide, 176 g. carbon dioxide, and 1.14 g. potassium stannate. The reactor was then closed and heated at 150°–160° C. for 7.8 hours. The pressure rose to a maximum of 1375 psig and equilibrated at 125 psig. The recovered product was then vacuum stripped to 150° C. at 2 mm. Hg and filtered with the aid of Hyflo Supercel filter aid. The recovered product amounted to 397 g. (69.4% theory). Properties of the water insoluble product were as follows:

Hydroxyl no., meq KOH/g: 130
Water, wt. %: 0.01
Viscosity, 25° C., cps.: 1220

The compounds listed in Tables 1–5 were prepared from various initiator compounds in accordance with the method described in the Example 1, except as otherwise indicated in the table itself.

TABLE 1

POLYCARBONATES FROM NONYL PHENOL

| Run no. | A | B | C | D[b] |
|---|---|---|---|---|
| Charge | | | | |
| Nonyl phenol, g. | 220 | 165 | 110 | 100 |
| Ethylene oxide, g. | 176 | 264 | 352 | 352 |
| Carbon dioxide, g. | 88 | 66 | 88 | 44 |
| Potassium stannate, g. | 1.65 | 1.2 | 1.1 | 1.6 |
| Mole ratio ethylene oxide + carbon dioxide/initiator | 6.0 | 10.0 | 20.0 | 20.0 |
| Reaction Details | | | | |
| Temperature, °C. | 185–200 | 175–200 | 188–200 | 180–202 |
| Pressure, psig | | | | |
| Max. | 680 | 1200 | 1525 | 1275 |
| Min. | 22 | 52 | 60 | 60 |
| Time, hr. | 8.0 | 3.3 | 5.0 | 3.3 |
| Yield, % | 85.4 | 87.3 | 76.5 | 87.6 |
| Properties | | | | |
| Acid no., mg KOH/g | — | — | 0.012 | — |
| Hydroxyl no., mg KOH/g | 150 | 108 | 82.5 | 77.4 |
| Water, wt. % | 0.01 | 0.01 | 0.04 | 0.01 |
| Viscosity, 25° C., cps | 650 | 1040 | 2050 | 780 |
| pH in 10:6 isopropanol-water | — | — | 8.3 | — |
| Potassium, ppm | — | — | — | 4.4 |
| Molecular weight[a] | 374 | 519 | 680 | 725 |

[a]From hydroxyl no.
[b]Product neutralized with synthetic magnesium silicate

TABLE 2

POLYCARBONATES FROM ETHOXYLATED DETERGENT ALCOHOL

| Run no. | E | F | G | I |
|---|---|---|---|---|
| Charge | | | | |
| Neodol 23-3[a], g. | 162 | 162 | 189 | 320 |
| Ethylene oxide, g. | 176 | 352 | 411 | 1056 |
| Carbon dioxide, g. | 44 | 88 | 103 | 264 |
| Potassium stannate, g. | 1.0 | 1.0 | 1.9 | 4.1 |
| Synthetic magnesium silicate, g.[b] | 4.0 | 4.0 | 7.6 | 16.4 |
| Mole ratio ethylene oxide + carbon dioxide/initiator | 10 | 20 | 19.1 | 30 |
| Reaction Details | | | | |
| Temperature, °C. | 175–197 | 150–202 | 160–180 | 170–201 |
| Pressure, psig | | | | |
| Max. | 890 | 1310 | 750 | 1190 |
| Min. | 45 | 58 | 75 | 66 |
| Time, hr. | 4.8 | 7.5 | 5.7 | 6.3 |
| Yield, % | 84.5 | 85 | 81.2 | 59.8 |
| Properties | | | | |
| Acid no., mg KOH/g. | 0.017 | 0.01 | — | 0.02 |
| Hydroxyl no., mg KOH/g. | 96.8 | 70.7 | 71.6 | 63.8 |
| Water, wt. % | 0.2 | 0.02 | 0.03 | 0.05 |
| Viscosity, 25° C., cps | 155 | — | — | — |
| Viscosity, °F., c.s. | | | | |
| 100 | — | 231 | 288 | 402 |
| 210 | — | 24.3 | 26 | 85.7 |
| pH in 10:6 isopropanol-water | — | 9.2 | 7.9 | 7.8 |
| Potassium, ppm. | — | 4.2 | 3.9 | 2.0 |
| Saponification no., mg KOH/g. | — | 151.9 | 19.1 | — |
| Carbon dioxide content, wt. % | — | 11.8 | 15 | — |

[a]Shell Chemical Co. - a three mole ethylene oxide adduct of a mixture of $C_{12}$ and $C_{13}$ alcohols.
[b]Brite Sorb 90, Philadelphia Quartz, used for neutralization of potassium stannate catalyst.

TABLE 3

POLYCARBONATES FROM SECONDARY DETERGENT ALCOHOL

| Run no. | J | K |
|---|---|---|
| Charge | | |
| Tergitol 15-S[a] | 171 | 171 |
| Ethylene oxide, g. | 264 | 264 |
| Carbon dioxide, g. | 66 | 66 |
| Potassium stannate, g. | 1.25 | 1.25 |
| Synthetic magnesium stannate, g.[b] | — | 5.0 |
| Mole ratio ethylene oxide + carbon dioxide/initiator | 10 | 10 |
| Details of Preparation | | |
| Temperature, °C. | 150–225 | 175–242 |
| Pressure, psig. | | |
| Max. | 950 | 1275 |
| Min. | 110 | 57 |
| Time, hr. | 6.0 | 3.4 |
| Yield, % | 70.9 | 81.8 |
| Properties | | |
| Hydroxyl no., mg KOH/g. | 202 | 137 |
| Water, wt. % | 0.02 | 0.06 |
| Viscosity, 25° C., cps | 64.3 | 110 |
| pH in 10:6 isopropanol-water | — | 8.9 |

[a]mixture of $C_{11}$-$C_{15}$ detergent grade secondary alcohols; Union Carbide Chemical Corp.
[b]Brite Sorb 90, Philadelphia Quartz Co.; used for neutralization of potassium stannate catalyst.

TABLE 4

POLYCARBONATES FROM NONYL PHENOL-ETHYLENE OXIDE ADDUCTS

| Run no. | L | M | N | O | P |
|---|---|---|---|---|---|
| Charge | | | | | |
| 6 Mole EO[a] | — | 968 | — | — | — |
| 9.5 Mole EO | — | — | — | — | 638 |
| 12 Mole EO | 1122 | — | 1122 | 748 | — |
| Ethylene oxide, g. | 264 | 352 | 396 | 352 | 440 |
| Carbon dioxide, g. | 132 | 88 | 198 | 176 | 220 |
| Potassium stannate, g. | 3.8 | 3.5 | 4.3 | 3.2 | 3.5 |
| Synthetic magnesium silicate[b], g. | 15.2 | 14.0 | 17.2 | 12.8 | 14.0 |
| Mole ratio ethylene oxide + carbon dioxide/initiator | 6.0 | 5.0 | 9.0 | 12.0 | 15.0 |
| Reaction Details | | | | | |
| Temperature, °C. | 155–177 | 144–160 | 175–176 | 175–180 | 150–178 |
| Pressure, psig | | | | | |
| Max. | 576 | 490 | 900 | 856 | 900 |
| Min. | 65 | 25 | 70 | 63 | 50 |
| Time, hr. | 6.3 | 6.3 | 5.5 | 5.6 | 5.3 |
| Yield, % | 96.7 | 33.3 | 84.9 | 81.3 | 54.2 |
| Properties | | | | | |
| Acid no., mg KOH/g | 0.019 | 0.01 | 0.02 | 0.028 | 0.027 |
| Hydroxyl no., mg KOH/g. | 73.4 | 83.4 | 56.2 | 54.3 | 58.5 |
| Water, wt. % | 0.013 | 0.08 | 0.09 | 0.06 | 0.1 |
| Viscosity, °F., c.s. | | | | | |
| 100 | 242 | 217 | 306 | 376 | 681 |
| 210 | 23.8 | 18.5 | 28.8 | 32.4 | 44.4 |
| pH in 10:6 isopropanol- water | 8.4 | 9.0 | 8.2 | 7.4 | 8.3 |

TABLE 4-continued
POLYCARBONATES FROM NONYL PHENOL-ETHYLENE OXIDE ADDUCTS

| Run no. | L | M | N | O | P |
|---|---|---|---|---|---|
| Potassium, ppm. | 0.4 | 0.9 | 3.9 | 3.5 | 2.6 |
| Saponification no., mg KOH/g. | — | — | 205.6 | 236.8 | — |
| Carbon dioxide content, wt. % | — | — | 16.1 | 18.6 | — |

[a]EO = ethylene oxide
[b]Brite Sorb 90, Philadelphia Quartz Co.; used for neutralization of potassium stannate.

TABLE 5

POLYCARBONATES FROM OLEIC ACID

| Run no. | R | S | T |
|---|---|---|---|
| Charge | | | |
| Oleic acid[a], g. | 424 | 424 | 848 |
| Ethylene oxide, g. | 1056 | 1173 | 2112 |
| Carbon dioxide, g. | 264 | 146.5 | 528 |
| Potassium stannate, g. | 4.4 | 4.4 | 3.8 |
| Synthetic magnesium silicate[b], g. | 16.6 | 1.5 g 85% $H_3PO_4$ | 35.2 |
| Mole ratio ethylene oxide + carbon dioxide/initiator | 20 | 20 | 20 |
| Reaction Details | | | |
| Temperature, °C. | 150–202 | 185–200 | 160–200 |
| Pressure, psig | | | |
| Max. | 1425 | 1270 | 1350 |
| Min. | 70 | 48 | 87 |
| Time, hr. | 5.7 | 4.4 | 3.9 |
| Yield, % | 67.7 | 80.9 | 73.8 |
| Properties | | | |
| Acid no., mg KOH/g. | 0.04 | 0.076 | 0.016 |
| Hydroxyl no., mg KOH/g. | 73.8 | 64.1 | 59.7 |
| Water, wt. % | 0.04 | 0.03 | 0.04 |
| Viscosity, °F., c.s. | | | |
| 100 | 226 | 228 | 472 |
| 210 | 31 | 25 | 33 |
| pH in 10:6 isopropanol-water | 7.7 | 7.6 | 7.7 |
| Potassium, ppm. | 0.4 | 12.4 | 0.9 |
| Saponification no., mg KOH/g. | — | 170.8 | 249.5 |
| Carbon dioxide content, wt. % | — | 13.4 | 19.6 |

[a]Emersol 220 white oleic acid, Emery Industries.
[b]Brite Sorb 90; Philadelphia Quartz; used for neutralization of potassium stannate To illustrate the effect of varying the mole ratio of the polycarbonate-forming reactants on the preparation of the final surfactant compounds prepared as described in previous examples were compared. To demonstrate the dramatic effect of the polycarbonate addition on the foam height the initiator surfactant, a 12 mole ethylene oxide adduct of nonyl phenol, was also tested. Note from the data reported in Table 6 that the other surfactant properties can also be improved at the higher ratios while the viscosity index remains relatively unaffected. Further, the cloud point is dramatically reduced.

TABLE 6

| Compound | Nonyl Phenol + 12 Mole EO | L | M | O | Q[a] |
|---|---|---|---|---|---|
| Mole ratio ethylene oxide/carbon dioxide | — | 2 | 2 | 2 | 2 |
| Mole ratio ethylene oxide + carbon dioxide/initiator | — | 6 | 9 | 12 | 24 |
| Surface tension, dynes/cm | | | | | |
| 1.0% Solution | — | 40.5 | 36.6 | 36.3 | 33.1 |
| 0.1% Solution | 32.3 | 40.5 | 36.9 | 36.1 | 33.2 |
| 0.01% Solution | — | 53.8 | 43.8 | 44.0 | 35.8 |
| Interfacial tension | | | | | |
| 1.0% | — | — | — | 1.88 | 2.28 |

TABLE 6-continued

| Compound | Nonyl Phenol + 12 Mole EO | L | M | O | Q[a] |
|---|---|---|---|---|---|
| 0.1% | 3.7 | — | — | 2.12 | 2.36 |
| 0.01% | — | — | — | 2.55 | 3.06 |
| Foam height, Ross Miles, mm (0.1% Solution, 120° F.) | | | | | |
| Initial | 110 | 65 | 49 | 30 | 28 |
| 5 minutes | — | 6 | 6 | 7 | 5.7 |
| Cloud Point, °C. | 81 | 54 | 50 | 46 | — |
| Viscosity Index[b] | 122 | 123.1 | 123.4 | 123.8 | — |

[a]Sample Q was prepared as were L, M and O in accordance with the procedure described in Example 1 using as the initiator a 12 mole adduct of nonyl phenol as the initiator.
[b]Calculated by the equation of Hardiman and Nissan:

$$\text{Viscosity Index} = 3.63 \left[ 60 - \text{antilog}\left( \frac{\log V_{100} - 0.4336}{\log V_{210}} \right) \right]$$

Table 7 illustrates the properties of polyether polycarbonates prepared with a three mole ethylene oxide adduct of a mixture of $C_{12}$ and $C_{13}$ detergent alcohols as an initiator. Again, increasing the mole ratio of alkylene oxide plus carbon dioxide to the initiator in the reaction forming the alkoxycarbonate claim segments reduces or eliminates the foaming of the aliphatic polyether carbonate materials without adversely effecting the surface active characteristics of the detergent.

TABLE 7

| Compound | E | G | F | H | I |
|---|---|---|---|---|---|
| Mole ratio of ethylene oxide/carbon dioxide | 4 | 4 | 4 | 4 | 4 |
| Mole ratio of ethylene oxide + carbon dioxide/initiator | 10 | 19 | 20 | 20 | 30 |
| Surface tension, dynes/cm | | | | | |
| 1.0% Solution | 29 | — | 30 | — | 33.6 |
| 0.1% Solution | 32 | — | 31.5 | — | 37.0 |
| 0.01% Solution | 52 | — | 40.7 | — | 70.8 |
| Interfacial tension, dynes/cm | | | | | |
| 1.0% Solution | 3.2 | — | 3.7 | .4 | — |
| 0.1% Solution | 10.1 | — | 9 | .85 | — |
| 0.01% Solution | 25.1 | — | 31.8 | 6.0 | — |
| Foam height, Ross Miles, mm (0.1% Solution, 120° F.) | | | | | |
| Initial | 53 | 13 | 32 | 0 | 12 |
| 5 minutes | 9 | 0 | 0 | 0 | 0 |
| Cloud point, °C. | <5 | — | — | 33 | — |
| Viscosity Index | — | 120 | 128 | 121 | 160 |

The following examples illustrate that other initiators and alkylene oxides may be used to prepare the polyether carbonate compounds of this invention useful as surface active agents and functional fluids.

EXAMPLE 2

This example will illustrate the preparation of a polyether polycarbonate from a glycol ether initiator (ethylene glycol monoethyl ether), a compound often used as a functional fluid. Using the procedure of Example 1, this product was prepared by reaction of 135 g., 264 g. ethylene oxide, 132 g. carbon dioxide (added as dry ice), and 1.0 g. potassium stannate. The resultant product had the following properties:

Hydroxyl no., mg KOH/g.: 201
Water, wt. %; 0.13
Viscosity, 25° C., cps.: 38.5

EXAMPLE 3

This example will illustrate a one-gallon preparation of a polyether polycarbonate from a three mole ethylene oxide adduct of a mixture of $C_{12}$ and $C_{13}$ detergent alcohols (Neodol 23-3; Shell Chemical Co.). Into a three-gallon stirred autoclave was charged 800 g. of the initiator compound and 10.3 g. potassium stannate. The reactor was then purged with nitrogen. Ethylene oxide (2640 g.) and carbon dioxide (660 g.) were then pressured into the reactor. The reactants were then heated at 175°–202° C. for 4.75 hours. The pressure rose to a maximum of 1525 psig and equilibrated at 95 psig. The crude product was then neutralized by stripping with 41.2 g. of a synthetic magnesium silicate (Brite Sorb 90). After neutralization, the product was vacuum stripped to 170° C. to a minimum pressure and then nitrogen-stripped for one-half hour. The product was then filtered with the aid of Hyflo Supercel (30 g.). The finished product (7.62 lb., 84.4% yield) had the following properties:

| | |
|---|---|
| Acid no., mg KOH/g. | 0.052 |
| Hydroxyl no., mg KOH/g. | 55.9 |
| Water, wt. % | 0.046 |
| pH in 10:6 isopropanol-water | 7.4 |
| Potassium, ppm. | 1.6 |
| Viscosity, °F., c.s. | |
| 100 | 567 |
| 210 | 46 |
| Saponification no., mg KOH/g. | 203.8 |
| Carbon dioxide content, wt. % | 16 |
| Flash Point, COC °F. | 435 |
| Fire Point, COC, °F. | 525 |
| Pour Point, °F. | 20 |

EXAMPLE 4

This example will illustrate the use of propylene oxide in the preparation of a polyether carbonate from a 12 mole ethoxylate of nonyl phenol initiator.

Into a one-gallon stirred autoclave were charged 1122 g. initiator compound and 4.6 g. potassium stannate. The reactor was then closed and purged with nitrogen. Propylene oxide (552 g.) and carbon dioxide (198 g.) were then pressured into the reactor. The reactants were heated at 175°–200° C. for 5.7 hours. The presure rose to a maximum of 990 psig and equilibrated at 120 psig. The crude product was neutralized with 30 g. of a synthetic magnesium silicate stripped to a minimum pressure at 186° C., and filtered with the aid of Hyflo Supercel. The finished product (2.48 lb.; 61.1% yield) had the following properties:

| | |
|---|---|
| Hydroxyl no., mg KOH/g. | 56.7 |
| Water, wt. % | 0.037 |

-continued

| | |
|---|---|
| pH in 10:6 isopropanol-water | 8.6 |
| Potassium, ppm. | 0.88 |
| Viscosity, °F., c.s. | |
| 100 | 171 |
| 210 | 19 |
| Saponification no., mg KOH/g. | 37.7 |
| Carbon dioxide content, wt. % | 2.96 |

EXAMPLE 5

This example will illustrate the preparation of a polyether polycarbonate from the 7 mole propoxylate of n-butanol.

Into a one-gallon stirred autoclave were charged 960 g. of the initiator compound and 5.7 g. potassium stannate. The reactor was then closed and purged with nitrogen. Ethylene oxide (1056 g.) and carbon dioxide (264 g.) were then pressured into the reactor. The reactants were then heated at 160°–190° C. for nine hours. The pressure rose to a maximum of 1560 psig and equilibrated at 98 psig. The crude product was then neutralized with 36 g. of a synthetic magnesium silicate stripped to a minimum pressure at 150° C., and filtered with the aid of Hyflo Supercel. The finished product (3.3 lb; 65.7% yield) had the following properties:

| | |
|---|---|
| Acid no., mg KOH/g. | 0.019 |
| Hydroxyl no., mg KOH/g. | 70.9 |
| Water, wt. % | 0.056 |
| Viscosity, °F., c.s. | |
| 100 | 174 |
| 210 | 20 |
| Saponification no., mg KOH/g. | 150.2 |
| Carbon dioxide content, wt. % | 11.8 |
| pH in 10:6 isopropanol-water | 7.4 |
| Potassium, ppm. | 2.4 |

EXAMPLE 6

This example will illustrate the utilization of ethylene carbonate as the source of ethylene oxide and carbon dioxide in the preparation of a polyether polycarbonate from methanol.

Into a five-gallon electrically heated kettle were charged 0.67 lb. methanol, 9.33 lb. ethylene carbonate, and 9.1 g. potassium stannate. The kettle was equipped with a reflux condenser, a back pressure regulator, and a wet test meter. The reactor was then evacuated and purged with prepurified nitrogen. The reaction mixture was then heated to 180° C. at which point carbon dioxide evolution began. With the back pressure regulator set at 100 psig the reaction mixture was heated 13.3 hours at 180°–185° C. until carbon dioxide evolution ceased. The crude product was then cooled to 90°–95° C. and neutralized with 36 g. synthetic magnesium silicate dispersed in water. The neutralized product was than vacuum stripped to a minimum pressure at 100° C., nitrogen-stripped and drained from the reactor. The recovered product (5.23 lb.) had the following properties:

| | |
|---|---|
| Hydroxyl no., mg KOH/g. | 47.7 |
| Water, wt. % | 0.02 |
| pH in 10:6 isopropanol-water | 7.7 |
| Potassium, ppm. | 9.8 |
| Sodium, ppm. | 9.6 |
| Viscosity, 25° C., cps. | 22350 |

Tables 8 and 9 further illustrate the various properties of the low foaming aliphatic polyether carbonate compounds of the instant invention.

TABLE 8

| Compound | C | D | K | R | S | Ex. 4 | Ex. 5 |
|---|---|---|---|---|---|---|---|
| Surface tension, dynes/cm | | | | | | | |
| 1.0% solution | | 29.5 | 29.8 | 30.1 | 32.4 | 31.7 | — |
| 0.1% solution | 29.6 | 30.4 | 36.3 | 33.7 | 34.6 | 31.7 | — |
| 0.01% solution | 32.2 | 51.3 | 64.8 | 65.1 | 32.9 | 31.7 | 36.8 |
| Interfacial tension, dynes/cm | | | | | | | |
| 1.0% solution | | 6.6 | 6.1 | 0.4 | 2.55 | 1.52 | — |
| 0.1% solution | 5.1 | 27.8 | 12 | 0.85 | 5.5 | 2.05 | — |
| 0.01% solution | 6.8 | 35.8 | 38 | 6.0 | 3.0 | 2.38 | 8.4 |
| Cloud point, °C. | <10° | <5° | <5° | 33° | <10° | 50.5° | <10° |
| Foam Height, Ross Miles, mm (0.1% solution, 120° F.) | | | | | | | |
| initial | 11 | 47 | 9 | 0 | 16 | 47 | 0 |
| 5 minutes | 7 | 15 | 7 | 0 | 3 | 3 | |
| Wetting time, Draves, sec. | | | | | | | |
| 0.25% solution, 3 g. hook | | 25 | 14 | 33 | 45.5 | 5.3 | 34 |
| 0.1% solution, 3 g. hook | | | 24 | | | 11.2 | |

TABLE 9

| Run no. | T | Ex. 3 | Ex. 4 | Ex. 5 |
|---|---|---|---|---|
| Viscosity, cs | | | | |
| at 100° F. | 412 | 567 | 171 | 174 |
| at 210° F. | 33 | 46 | 19 | 20 |
| Viscosity Index | 109 | 127 | 125 | 129 |
| Flash point, °F. | 485° | 435° | 510° | 385° |
| Pour point, °F. | 20° | 20° | 60° | 0° |

Although the present invention has been described with reference to specific details of certain embodiments, it is not intended that the invention be construed as being limited to such details except insofar as they appear in the appended claims.

We claim:

1. A mixture of low foaming aliphatic polyether-carbonate compounds for use as surface active agents or functional fluids, such compounds consisting of:
   (a) an initiator compound segment derived from an initiator compound having a single reactive hydroxyl or carboxyl group attached to an alkyl or alkylphenyl group, or an alkylene oxide adduct thereof; and
   (b) an alkoxycarbonyl chain group attached to the initiator compound at the site of the hydroxyl or carboxyl group by the reaction of an alkylene carbonate having from 2 to 6 carbon atoms or a mixture of an alkylene oxide, having 2 to 5 carbon atoms, and carbon dioxide at the ratio of from 1 to 10 moles of the alkylene oxide per mole of carbon dioxide; wherein there is present an average of from 1 to 30 carbonyl groups in the alkoxycarbonyl chain segment per mole of initiator compound.

2. The mixture of low foaming aliphatic polyethercarbonate compounds of claim 1 wherein the initiator compound is an alcohol having up to about 22 carbon atoms.

3. The mixture of low foaming aliphatic polyethercabonate compounds of claim 2 wherein the alcohol is a detergent grade alcohol, having from 6 to 22 carbon atoms.

4. The mixture of low foaming aliphatic polyethercarbonate compounds of claim 1 wherein the initiator is a carboxylic acid having from about 4 to about 22 carbon atoms.

5. The mixture of low foaming aliphatic polyethercarbonate compounds of claim 1 wherein the initiator is an alkyl phenol wherein the alkyl group has from 4 to about 12 carbon atoms.

6. The mixture of low foaming aliphatic polyethercarbonate compounds of claim 1 wherein the initiator is an adduct of an alkyl phenol, wherein the alkyl groups has from 4 to about 16 carbon atoms, and an average of from 6 to about 12 moles of ethylene oxide.

7. The mixture of low foaming aliphatic polyethercarbonate compounds of claim 1 wherein the alkylene oxide in the ethoxycarbonyl chain segment is ethylene oxide.

8. The mixture of low foaming aliphatic polyethercarbonate compounds of claim 7 wherein the initiator is reacted with a mixture of ethylene oxide and carbon dioxide at a ratio of from 2 to about 6 moles ethylene oxide per mole of carbon dioxide.

9. The mixture of low foaming aliphatic polyethercarbonate compounds of claim 8 wherein there is present an average of from about 10 carbonyl groups in the ethoxycarbonyl chain segment per mole of initiator compound.

10. A mixture of low foaming aliphatic polyether-carbonate compounds for use as surface active agents, said compounds consisting of:
  (a) an initiator compound segment derived from an adduct of an alkyl phenol, wherein the alkyl group has an average of from 4 to 16 carbon atoms, and from 6 to 12 moles of ethylene oxide; and
  (b) an ethoxycarbonyl chain segment attached to the initiator compound at the site of the hydroxyl group by the reaction of a mixture of ethylene oxide and carbon dioxide at a ratio of from about 1 to about 4 in amounts such that there is present an average of from about 5 to about 15 carbonyl groups in the ethoxycarbonyl chain segment per mole of initiator compounds.

* * * * *